United States Patent
Hertel et al.

(10) Patent No.: US 8,820,699 B2
(45) Date of Patent: Sep. 2, 2014

(54) TORQUE SUPPORT FOR A CONVERTER TILTING DRIVE

(75) Inventors: Jörg Hertel, Hilchenbach (DE);
Benjamin Wallmeroth, Betzdorf (DE);
Lutz Rose, Duisburg (DE); Christoph Sundermann, Hilchenbach (DE);
Stephan Schulze, Ratingen (DE);
Christian Imiela, Duesseldorf (DE);
Wolfgang Igelhorst, Muelheim a.d. Ruhr (DE); Uwe Thiedemann, Krefeld (DE)

(73) Assignee: SMS Siemag AG, Duesseldorf (DE)

( * ) Notice: Subject to any disclaimer, the term of this patent is extended or adjusted under 35 U.S.C. 154(b) by 825 days.

(21) Appl. No.: 13/001,185

(22) PCT Filed: May 8, 2009

(86) PCT No.: PCT/DE2009/000664
§ 371 (c)(1),
(2), (4) Date: Mar. 10, 2011

(87) PCT Pub. No.: WO2009/155892
PCT Pub. Date: Dec. 30, 2009

(65) Prior Publication Data
US 2011/0204204 A1 Aug. 25, 2011

(30) Foreign Application Priority Data

Jun. 25, 2008 (DE) .................. 10 2008 030 192

(51) Int. Cl.
*F16H 37/06* (2006.01)

(52) U.S. Cl.
USPC ............................ 248/562; 475/206

(58) Field of Classification Search
USPC ............................ 248/550, 562; 475/206, 207
See application file for complete search history.

(56) References Cited

U.S. PATENT DOCUMENTS

| 4,265,136 | A | | 5/1981 | Riegler et al. | |
|---|---|---|---|---|---|
| 4,932,289 | A | * | 6/1990 | Bitcon | 74/606 R |
| 5,003,835 | A | | 4/1991 | Ackermann et al. | |
| 6,158,302 | A | * | 12/2000 | Becker et al. | 74/606 R |
| 7,112,157 | B2 | * | 9/2006 | Uebbing | 475/330 |
| 7,520,833 | B2 | * | 4/2009 | Honda et al. | 475/248 |
| 7,810,281 | B2 | * | 10/2010 | Warren et al. | 49/349 |
| 8,316,738 | B2 | * | 11/2012 | Hellinger et al. | 74/665 H |
| 2009/0270217 | A1 | * | 10/2009 | Zohrer | 475/225 |

FOREIGN PATENT DOCUMENTS

| DE | 22 01 296 | 8/1972 |
|---|---|---|
| DE | 38 27 329 | 2/1990 |
| EP | 0 003 108 | 7/1979 |
| JP | 53 031070 | 3/1978 |
| SU | 403 745 | 10/1973 |

* cited by examiner

*Primary Examiner* — Steven Marsh
(74) *Attorney, Agent, or Firm* — Cozen O'Connor

(57) ABSTRACT

A torque support for a converter tilting drive mounted on a shaft journal. The supports are provided on the gear housing that accommodates the shaft journal to be driven. The supports support the gear housing on the structure carrying the converter. To this end, the supports are embodied in each case as dual action hydraulic piston-cylinder units that are independently anchored on the structure in an articulated manner.

8 Claims, 1 Drawing Sheet

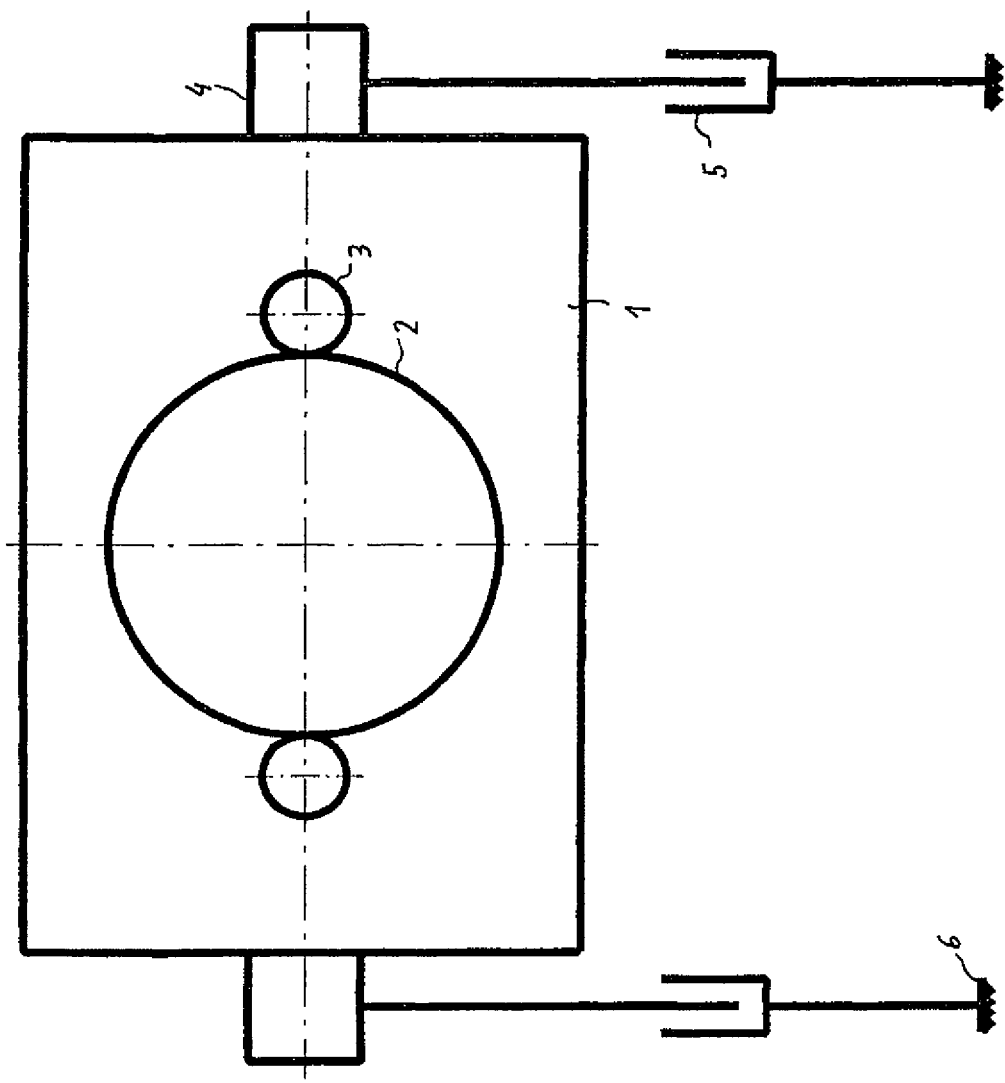

US 8,820,699 B2

TORQUE SUPPORT FOR A CONVERTER TILTING DRIVE

PRIORITY CLAIM

This is a U.S. national stage of Application No. PCT/DE2009/000664, filed on May 8, 2009, which claims priority to German Application No: 10 2008 030 192.2, filed: Jun. 25, 2008, the contents of which are incorporated herein by reference.

BACKGROUND OF THE INVENTION

1. Field of the Invention

The invention is directed to a torque support for a converter tilting drive mounted on a shaft journal, wherein supports are provided at the gear unit housing receiving the driven shaft journal for support on the structure carrying the converter.

2. Related Art

A torque support for drives mounted on shaft journals, particularly for converter tilting drives in which the gear unit housing is mounted on the shaft journal to be driven, is known from DE 38 27 329 A1.

Steering rods that communicate at the bottom with joint bearings which are in turn connected to one another by a torsion bar are arranged at the gear unit housing to be symmetric to the axis of rotation of the shaft journal. Each steering rod comprises two parts between which spring elements are arranged that can be preloaded by a mechanical device.

The torsion shaft offers freedom from transverse force (transverse force is a bending force due to the application of torque), but is not suitable for the high dynamics arising from the blowing process because large swiveling angles together with high forces in all four pivot points below at the shaft cause friction wear and microcorrosion.

The torsion shaft cannot be regulated, and active influence is impossible.

In another torque support disclosed in EP 0003 108A1, single-acting piston cylinders which can be acted upon by compressed gas are provided on both sides of the converter axis for elastic support.

However, this support is not free from transverse force because when torque is introduced along the converter journal axis, only one of the cylinders can be loaded, while the opposite cylinder is relieved. This necessarily results in a bending force on the converter journal, i.e., the axle of the converter journal carrying the gear unit is bent by the one-sided cylinder force multiplied by the distance of the cylinder from the converter axis.

SUMMARY OF THE INVENTION

It is an object of one embodiment of the invention to provide an improved torque support for a converter tilting drive.

According to one embodiment of the invention, a torque support for a converter tilting drive mounted on a shaft journal includes supports at the gear unit housing receiving the shaft journal to be driven for support on the structure carrying the converter, the supports are each anchored independently at the structure in an articulated manner. The supports are each constructed as double-acting hydraulic piston-cylinder units, and at least one of these hydraulic piston-cylinder units is arranged in such a way that it can be released to follow the converter movement without power.

In contrast to the prior art mentioned above, the cylinders in this torque support according to the invention are double acting. They set forces of equal magnitude in opposition to the torque introduced by the converter opposite one another at both sides of the converter axle, these forces are configured to cancel each other out so that no bending forces are generated at the journal by the application of torque.

Therefore, the support presents a connection between the tilting drive and the supporting structure which permits any movement of the drive except the rotation of the drive around the converter journal axis during the blowing process, introducing only torque in the journal, specifically also without bending forces at the journal.

Since the torque at the journal resulting from the blowing process can amount to a multiple of the restoring moment during the tilting of the converter, it is useful to guarantee the absence of bending forces from the application of torque during blowing.

During tilting with smaller forces and without the dynamics of the process, the journal easily also withstands bending forces from applied torque.

The use of double-acting hydraulic piston-cylinder units offers many advantages. For example, they can be controllable for active or passive vibration damping during the blowing of the converter.

They can be controllable separately and differently so that, for example, when tilting, they can be rigid on one side or, even during blowing, rigid on both sides and, therefore, free from transverse force.

This novel system takes into account the displacement of the converter journal axis during tilting (due to different load states and/or deformation due to thermal and/or mechanical influences) in that one of the two cylinders is released. Accordingly, transverse force occurs during tilting due to the restoring moment of the converter and the lever for the locked cylinder, but there is no constraint between the drive and the foundation. During tilting, the drive inclines in the released cylinder by its moving axle with the locked cylinder as fixed support.

This can be summarized as follows:

1. The cylinders can transmit pushing forces and pulling forces of equal and opposing magnitude on both sides (condition for absence of bending forces) when the cylinders are locked hydraulically or are controlled so as to maintain their position.
2. A spring action of the system can be controlled so as to be adapted to different operating states.
3. Due to the fact that the cylinders are connected in an articulated manner and accordingly ensure the necessary degrees of freedom in every direction other than the cylinder axis, the joint bearings experience only negligibly small angles when load is applied and are not subject to friction wear.
4. Small static load deviations of the gear unit/journal axle during blowing are compensated by inner leakages of the cylinders or corresponding cylinder control so that the absence of transverse force is maintained over the blowing period.
5. System offers the possibility of compensating completely or partially, or even overcompensating, for the own weight of the drive so as to further relieve, or deliberately load, the journal and supporting ring bearing without transverse forces from the process.
6. An active damping of the vibrations resulting from the blowing process is possible by means of deliberate cylinder control without transverse forces from the process.
7. Position of the blowing vessel can be varied during blowing for optimizing the process by moving the cylinders without transverse forces from the process.

BRIEF DESCRIPTION OF DRAWINGS

FIG. 1 is a schematic view of a torque support according to one embodiment of the invention.

DETAILED DESCRIPTION OF THE DRAWINGS

An embodiment example is shown schematically in FIG. 1; the converter itself is not shown.

The gear unit housing which is arranged so as to be mounted on the shaft journal of the converter, not shown, is designated by 1.

The converter tilting drive is indicated by 2 and 3.

Brackets 4 or the like are provided at the gear unit housing 1 on the sides of the shaft journal to help support the gear unit housing 1 on the supporting structure by the piston-cylinder units 5. The supports are anchored at a structure 6.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A torque support for a converter tilting drive mounted on a shaft journal, comprising:
   a gear unit housing configured to receiving the shaft journal for support on a structure; and
   a plurality of supports provided at the gear unit housing, the plural supports are each constructed as a double-acting hydraulic piston-cylinder unit and are independently anchored at the structure in an articulated manner,
   wherein at least one of the plural hydraulic piston-cylinder units is configured to be released to follow a converter movement without power.

2. The torque support according to claim 1, wherein the plural piston-cylinder units are adjustable for synchronous running.

3. The torque support according to claim 1, wherein during a blowing of the converter, the plural piston-cylinder units are one of controlled and locked for one of active vibration damping and passive vibration damping.

4. The torque support according to claim 1, wherein each of the plural piston-cylinder units is configured for individual control.

5. The torque support according to claim 2, wherein during a blowing of the converter, the plural piston-cylinder units are configured for one of controlled and locked for one of active vibration damping and passive vibration damping.

6. The torque support according to claim 5, wherein each of the plural piston-cylinder units is configured for individual control.

7. The torque support according to claim 6, wherein during a blowing of the converter, the plural piston-cylinder units are configured for one of controlled and locked for one of active vibration damping and passive vibration damping.

8. The torque support according to claim 1, wherein the plural piston-cylinder units are each configured for one of active vibration damping and passive vibration damping.

\* \* \* \* \*